United States Patent [19]

Davis

[11] Patent Number: 5,049,233
[45] Date of Patent: Sep. 17, 1991

[54] RECOVERY OF SODIUM HYDROXIDE AND ALUMINUM HYDROXIDE FROM ETCHING WASTE

[75] Inventor: Thomas A. Davis, Annandale, N.J.

[73] Assignee: The Graver Company, Union, N.J.

[21] Appl. No.: 519,396

[22] Filed: Jul. 6, 1990

[51] Int. Cl.$^5$ .......................... B44C 1/22; C23F 1/00; C03C 15/00; C03C 25/06

[52] U.S. Cl. .................................. 156/642; 156/665; 156/345

[58] Field of Search ............... 156/642, 656, 665, 345; 423/127, 130, 629, DIG. 14; 252/79.5

[56] References Cited

U.S. PATENT DOCUMENTS

| | | | |
|---|---|---|---|
| 2,653,858 | 9/1953 | Brown | 423/130 X |
| 2,975,041 | 3/1961 | Holman | 156/642 |
| 3,607,482 | 9/1971 | Selm | 156/642 |
| 3,607,549 | 9/1971 | Bielefeld et al. | 156/642 X |
| 4,136,026 | 1/1979 | Meyer et al. | 156/642 X |
| 4,372,805 | 2/1983 | Takahashi et al. | 156/642 |
| 4,601,780 | 7/1986 | Coogins et al. | 156/642 |
| 4,786,482 | 11/1988 | The et al. | 423/130 |
| 4,826,605 | 5/1989 | Doble et al. | 210/721 |
| 4,857,200 | 8/1989 | Kelham | 210/651 |

Primary Examiner—William A. Powell
Attorney, Agent, or Firm—Dressler, Goldsmith, Shore, Sutker & Milnamow, Ltd.

[57] ABSTRACT

A method for the recovery and recycling of sodium hydroxide from the waste solution of aluminum etching operations. The method utilizes a dialysis membrane column or stack to initially remove sodium hydroxide from the waste solution and return it to the etch tank base solution sufficiently concentrated to carry on the basic etching operation. The method permits the recovery of salable quantities of aluminum hydroxide.

23 Claims, 2 Drawing Sheets

FIG_1

RECOVERY OF SODIUM HYDROXIDE AND ALUMINUM HYDROXIDE FROM ETCHING WASTE

BACKGROUND OF THE INVENTION

This invention relates to the treatment of the waste stream from aluminum dissolution operations and, more particularly, to an improved method for regenerating the alkali etch solution and recovering aluminum hydroxide.

Treatment of aluminum articles of manufacture is carried out by such well known processes as etching, cleaning or chemical milling. Typically these processes involve the dissolution of aluminum metal according to the equation:

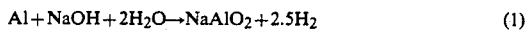

$$Al + NaOH + 2H_2O \rightarrow NaAlO_2 + 2.5H_2 \quad (1)$$

According to reaction (1), there is an increase in the concentration of the $NaAlO_2$ and a decrease in the concentration of the alkali as the aluminum metal dissolves. However, the aluminate is not stable in water and, depending on existing conditions of temperature, concentrations and time, reacts with the water according to the following equilibrium equation:

$$NaAlO_2 + 2H_2O \rightleftharpoons NaOH + Al(OH)_3 \quad (2)$$

Theoretically, further additions of NaOH are required only to replace that which is physically attached to the work pieces removed from the bath. However, if the $Al(OH)_3$ is allowed to precipitate out in the etch bath, it is well known that the etch solution eventually becomes ineffective and unusable for carrying on the process and must be discarded and replaced. Attempts have been made to avoid the problems and waste of materials alluded to above.

In U.S. Pat. No. 4,372,805, there is shown a method for regenerating the sodium hydroxide wherein water is added to the solution containing dissolved aluminum to create a supersaturated solution of aluminum hydroxide, crystallizing the aluminum hydroxide, removing the same from the etch waste solution by centrifugation, and then recycling the remaining liquid to the etch tank. Examining equation (2) above, it would appear that the addition of water to the etch waste solution causes a shift of the equilibrium to the right in accordance with Le Chatelier's Principle, thereby causing the formation of increased aluminum hydroxide. However, that process is not completely satisfactory because the sodium hydroxide being recycled is diluted to such an extent that it is not sufficiently concentrated for use in the etching bath. In this regard, it is noted that the patent teaches the use of an evaporator in an effort to increase the concentration of the alkali.

In U.S. Pat. No. 4,136,026, there is shown another method wherein the etch waste solution is transferred first to a reactor vessel where it is apparently agitated to induce some precipitation of aluminum hydroxide. Some of the liquid from the reactor vessel is then transferred to a separator vessel where the aluminum hydroxide is separated from the solution with a vacuum drum filter. Due to the slow precipitation rate of aluminum hydroxide, the filter medium, as well as the filter cake, collects precipitate and problems of plugging soon occurred.

There thus exists a need for a more effective method of recovering and recycling the alkali from the etch waste solutions of aluminum dissolution operations.

SUMMARY OF THE INVENTION

The present invention provides an improved method of recovering sodium hydroxide from etch waste solutions that substantially eliminates the above described problems inherent in the prior art methods. The sodium hydroxide recovered is sufficiently concentrated for recycling and use in the etching operations and is also substantially free of contamination by dissolved aluminum present in the waste solution being treated. The method of the invention also permits the recovery of substantial amounts of aluminum hydroxide which is a commercially useful product.

Briefly, the invention comprises a departure from the prior art methods which add water to the etch waste solution in order to induce aluminum hydroxide precipitation and sodium hydroxide formation. Instead, the inventive method removes sodium hydroxide initially from the waste solution and recycles it directly back into the etching tank. The remaining aluminum-containing solution is treated in a particle-contacting crystallizer where solid aluminum hydroxide is recovered.

An important component of the present method is a diffusion dialyzer. The dialyzer includes one or more ion exchange membranes which are substantially permeable to sodium hydroxide but substantially less permeable to aluminum salts. The etch waste solution is fed into a diffusion dialyzer stack on one side of the ion exchange membrane. Water is simultaneously fed into the stack on the opposite side of the membrane and countercurrent to the flow of the waste solution. Sodium hydroxide diffuses across the membrane into the receiving water stream which is returned to the etching tank. Since this addition of sodium hydroxide would tend to precipitate many multi-valent cations present in tap water, it is beneficial to feed soft water into the diffusion dialyzer. Also, it is known that air is much less soluble in sodium hydroxide solution than in water, so the diffusion of sodium hydroxide into the water would tend to cause air bubbles to be released into the solution. Since accumulation of the air in the tops of the downward-flowing stream could lead to maldistribution of flow rates among the multiple parallel compartments of a diffusion dialyzer, it is beneficial to deaerate the feed water and to periodically reverse the water flow to purge any gases that accumulate in the water compartments. The salt-containing waste solution passes, after cooling, to a crystallizer vessel for removal of precipitated aluminum hydroxide. The remaining dilute waste solution may be discarded or treated further for the recovery of what small amounts of alkali remain therein.

Some aluminum etching operations, especially chemical milling, evolve enough heat to boil away considerable water from the bath, and this water must be replaced. Since the overflow from the crystallizer in the present method contains useful components of the bath, i.e., NaOH and other bath additives, it is a preferred source of make-up water for the etch bath. Moreover, return of the overflow to the bath eliminates the need for disposal or further treatment of the overflow. However, a high utilization of the crystallizer overflow as makeup water would eliminate a means of purge or blowdown of impurities that enter with makeup water.

In such a case it is beneficial to deionize the make-up water and the feed water to the diffusion dialyzer.

The method is simple and efficient and does not require the use of many sophisticated controls. Other features and advantages of the invention will become apparent from the following description of preferred embodiments from the claims and from the accompanying drawing.

DESCRIPTION OF PREFERRED EMBODIMENTS

Figure 1:
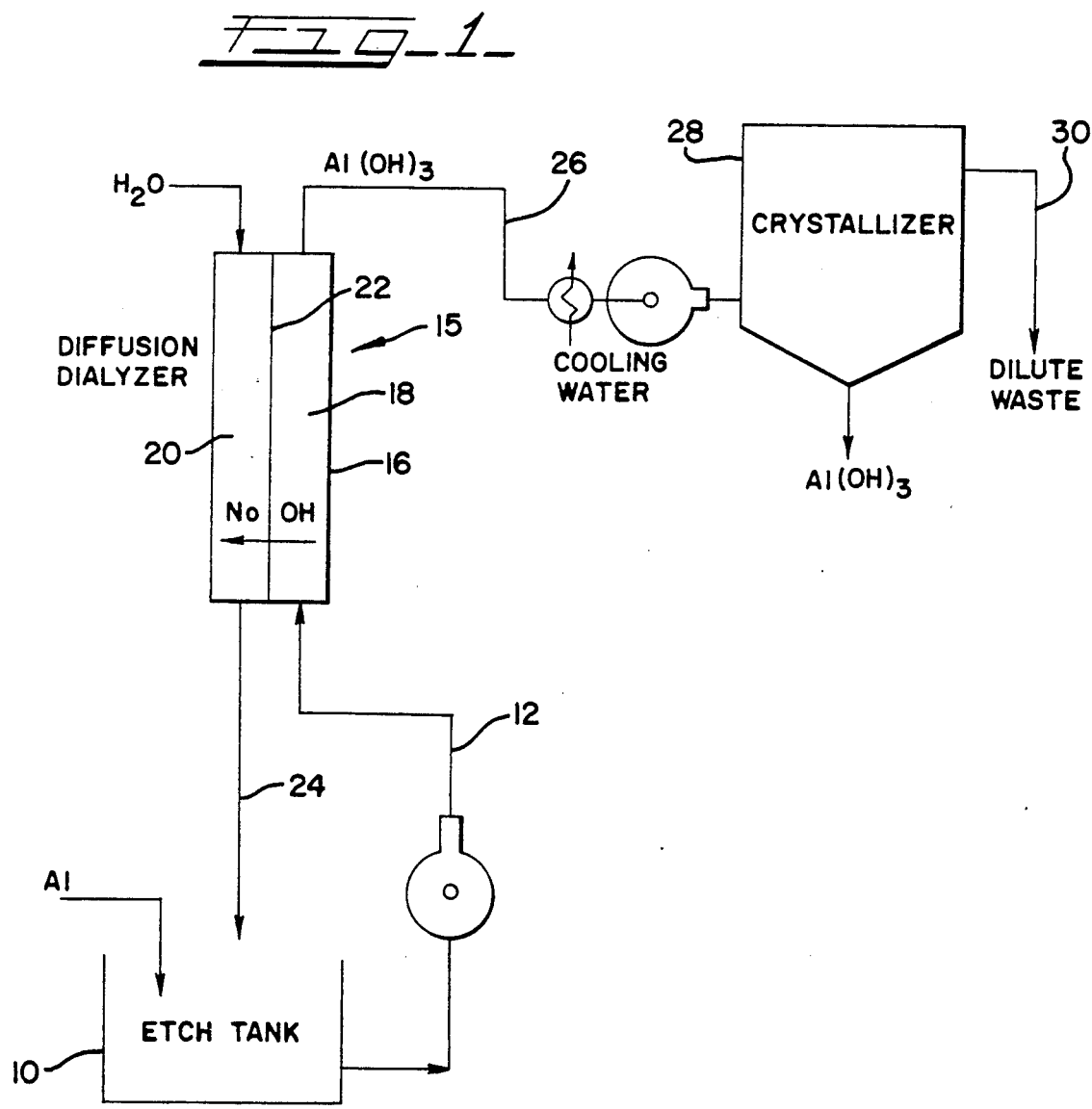
FIG. 1 is a schematic representation of the steps and apparatus for practicing the method embodying the principles of the invention.

Referring to FIG. 1, there is shown a method of recovering and recycling sodium hydroxide and also recovering useful aluminum hydroxide. The embodiment shown is employed in connection with a conventional aluminum etching operation wherein aluminum articles are immersed for relatively short periods in an etch tank 10 containing a bath of sodium hydroxide and water. Dissolution of the aluminum takes place as indicated in equation (1) above.

Waste solution is pumped from the tank 10 through line 12 and into a diffusion dialyzer 15. Diffusion dialyzer 15 comprises a liquid flow vessel 16 divided into chambers or channels 18 and 20 on opposite sides of an ion-exchange membrane 22. As shown, the waste solution is pumped into and flows upwardly through channel 18. Simultaneously, a stream of warm water, which has been softened and degassed by boiling, is pumped into and flows downwardly through channel 20. Preferably, the water and waste solution are here supplied to the dialyzer 15 at substantially equal rates.

Membrane 22 is substantially permeable to sodium hydroxide and substantially less permeable to the dissolved aluminum or aluminum salts. Such membranes are of a type commonly available and manufactured by companies like Pall/RAI under the trade designation BDM and Tokuyama Soda under the trade designation Neosepta CR-2. Inside the dialyzer column 15, sodium hydroxide migrates across the membrane 22 and into the water stream and the recovered sodium hydroxide is discharged back into the etch tank 10 as indicated through line 24. The recycled sodium hydroxide is sufficiently concentrated to be useful in carrying on the basic etching operation.

The alkali-depleted waste stream exits from the top of channel 18 through line 26 and is cooled, preferably by a water jacket heat exchanger or the like, and then pumped into a crystallizer vessel 28. The waste solution exiting from the dialyzer column 15 is believed to be supersaturated in aluminum hydroxide, which is known to be extremely slow to precipitate from aqueous solution under normal conditions. The crystallizer vessel 28 is of known construction and provides nucleation sites for enhancing the formation and precipitation of aluminum hydroxide which is removable from the bottom of the vessel as illustrated. The overflow from vessel 28 is a dilute waste solution 30 low in remaining sodium hydroxide and/or aluminum hydroxide and may be disposed of as waste or in some cases used as make-up water for the etch tank. However, if desired, the waste solution 30 may be further treated as before in a second diffusion dialyzer for recovery of any remaining usable components.

It has been determined that optimum results are achieved if the water fed into the dialyzer is warmed to a temperature at or above that of the waste solution being fed to the dialyzer. Thus, the water temperature should be preferably between 105° F. and 130° F., and most preferably about 120° F. The ratio of water flow rate to waste solution flow rate also affects the results achieved. That ratio is preferably in the range of 0.5 and 4.0 to 1 and most preferably about 2 to 1.

Depending upon the size and nature of the particular aluminum dissolution operation (i.e., etching, cleaning or chemical milling), the diffusion dialyzer may comprise a plurality of diffusion membranes properly spaced to provide a stack with waste solution and water channels on opposite sides of each membrane. The nature of the operation will also determine if certain temperature and/or filtration controls of the waste solution being fed into the dialyzer are required. For example, in a simple etching operation of the type already described, the temperature of the etch bath is not raised substantially above ambient. On the other hand, chemical milling operations which dissolve larger amounts of metal produce bath temperatures at or near the boiling point of water and also significant amounts of other metals, such as copper. Since waste solution temperatures approaching 212° F. would be destructive of the membranes in the dialyzer, it is desirable to first cool the waste solution to temperatures near ambient. Similarly, it is common practice in milling operations to add a precipitating agent like $Na_2S$ to the bath for precipitating out the dissolved copper and other metals. The precipitated sulfides form a sludge which desirably is filtered from the waste solution before feeding into the dialyzer.

Figure 2:
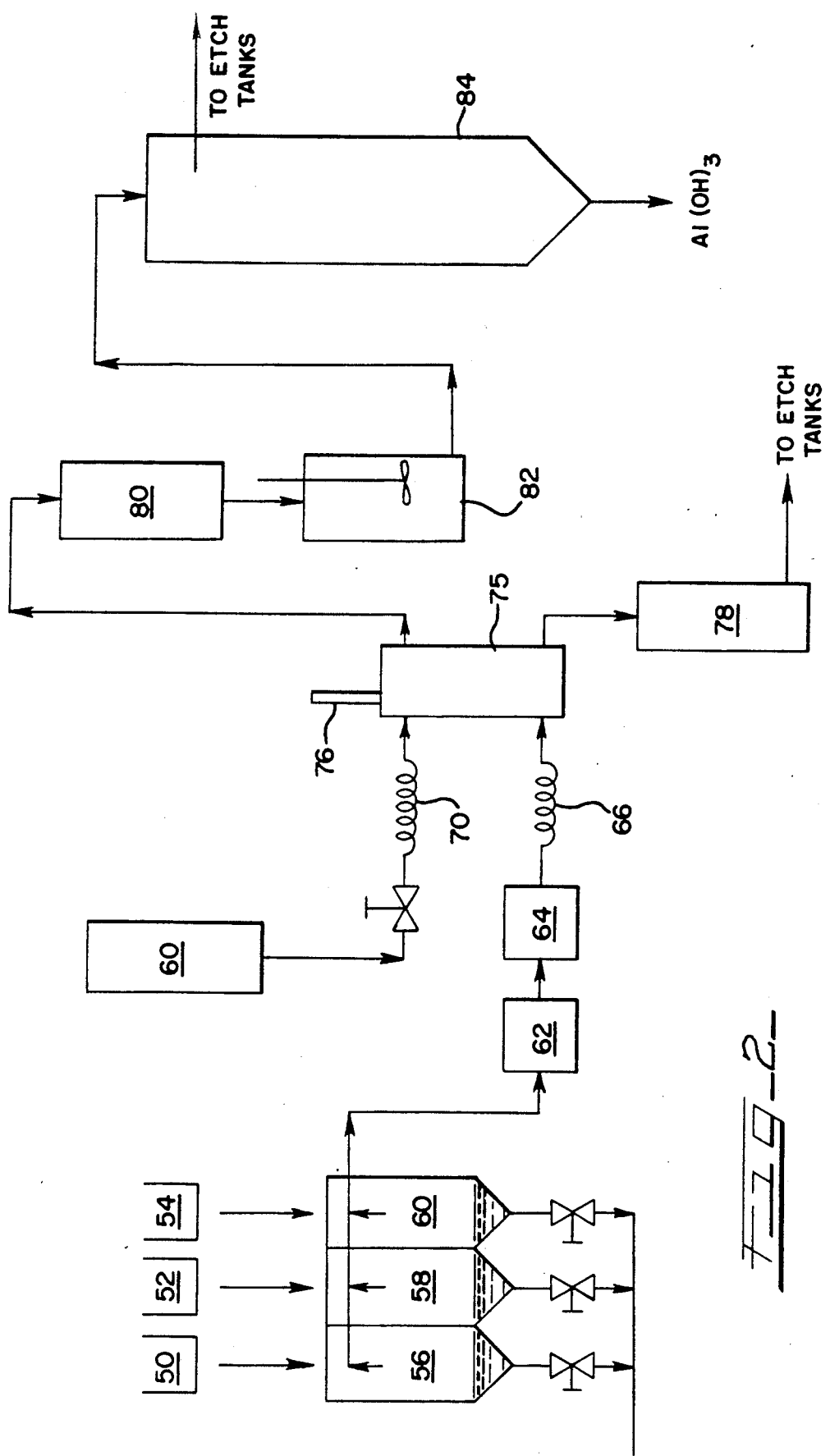
FIG. 2 is a schematic representation of the inventive method and apparatus shown in use with a milling operation plant.

Referring now to FIG. 2, there is schematically illustrated a chemical milling operation with which the inventive method is used for recovering the sodium hydroxide and aluminum hydroxide. The milling operation comprises multiple etch tanks 50, 52, 54, from which the waste solution is fed first into settling tanks 56, 58, 60, for removal of sulfide precipitates. The supernatant solution is then pumped through filter means 62, 64, to remove any remaining sludge. The temperature of the clear waste solution is regulated in suitable temperature control means 66 to approximately ambient, and then pumped into a diffusion dialyzer stack 75 to flow upwardly therethrough. A water tank 68 is provided having associated hot air or steam means for degassing the water. The degassed water is pumped through suitable temperature control means 70 to reach a preferred temperature of around 120° F. and then into the top of the dialyzer 75 to flow downwardly therethrough. In the embodiment of FIG. 2, the dialyzer 75 comprises multiple diffusion membranes and includes vent means 76 for periodically purging any air bubbles from the flow channels in the dialyzer. Storage tanks 78 and 80 are provided for respectively receiving the sodium hydroxide and the alkali-depleted salt solution. Sodium hydroxide from tank 78 is recycled and fed back into the etch tanks 50, 52, 54, as desired. The salt solution from tank 80 is fed into conventional crystallizing or precipitating means, in this embodiment, a mixing tank 82, where the solution may contact previously precipitated $Al(OH)_3$, and settling tank 84 from which precipitated aluminum hydroxide is removed. The supernatant liquid from the settling tank 84 is, in this operation, also recycled back into the etch tanks, for recapture of the remaining sodium hydroxide and also to replace the water which is being evaporated from the hot etch tanks.

The invention is illustrated further by the following examples.

EXAMPLE 1

In accordance with FIG. 1, etch waste solution containing about 8% sodium hydroxide was fed into a dialyzer column comprising a single BDM ionexchange membrane with about 2 dm$^2$ of exposed area. The waste solution and water were fed to the dialyzer by a dual head, size 13 Masterflex pump operating at 28.5 rpm to supply the solutions at equal rates. The system was operated overnight and samples taken the following day. The measured output flow rates were 0.44 ml/min. for the recovered base and 1.22 ml/min. for the treated etching solution. Analysis of the samples by titration with HCl showed that the concentration of the recovered base (viz, free base) was substantially higher than in the feed waste solution, thereby suggesting that $NaAlO_2$ was being decomposed and releasing bound sodium hydroxide. Titration of the treated waste solution indicated that virtually all of the free sodium hydroxide had been removed and that most of the dissolved aluminum remained, although some aluminum may also have permeated the membrane and returned with the recovered sodium hydroxide.

EXAMPLE 2

In a system according to FIG. 2, a diffusion dialysis stack was assembled with ten sheets of Neosepta CR-2 membrane separated by Vexar-type spacers about 0.75 mm thick. Each membrane sheet had about 175 cm$^2$ of its surface exposed to the solutions. Alternate solution compartments were fed with water flowing downward and a spent aluminum chemical milling etchant flowing upward. The water, which had been demineralized and boiled, was warmed to about 110° F. by passing it through a heating coil before it entered the stack. Analysis was by titration with $H_2SO_4$. In an experiment of 450 min duration, a 2371 ml batch of etchant was treated in the stack. The etchant contained 144 g/li of free NaOH, and 476 g/li of $NaAlO_2$. A 2644 ml batch of base was recovered composed of 109 g/li of free NaOH, and 15 g/li of $NaAlO_2$. The 4060 ml batch of base-depleted salt solution contained 12 g/li of free NaOH, and 272 g/li of $NaAlO_2$. Upon standing at room temperature, a voluminous white precipitate of $Al(OH)_3$ formed in the base-depleted salt solution.

The precise chemistry of the method is not completely understood, but it is theorized that the salutary results obtained indicate another operation of Le Chatelier's Principle. Referring again to equilibrium equation (2), it will be noted that removal of sodium hydroxide causes shifting of the equilibrium to the right with the depletion of sodium aluminate and the increased production of aluminum hydroxide. The treated solution exiting from the dialyzer apparently becomes supersaturated in aluminum hydroxide which is then readily removable in the nucleating crystallizer or other settling vessel. It is also theorized that the difference in flow rates and increase in concentration of free sodium hydroxide in the recovered base was caused by osmotic water removal from the water stream through the membrane.

It should be understood that the language employed herein is for descriptive purposes only and is not intended to be otherwise limiting of the concepts of the invention. Although the illustrations and examples herein utilize flat sheet membranes, other configurations such as tubular or spiral wound devices could be employed. While preferred embodiments have been described, changes and variations may be made by those skilled in the art without departing from the spirit and scope of the invention as defined in the appended claims.

What is claimed is:

1. A method of recovering sodium hydroxide from an etch tank waste solution containing dissolved aluminum comprising:
    directing a stream of the waste solution into a diffusion dialyzer containing permeable membrane means that is permeable to sodium hydroxide and substantially less permeable to dissolved aluminum on one side of the membrane means;
    simultaneously directing a stream of water into the dialyzer on the opposite side of the membrane means whereby sodium hydroxide migrates through said membrane means from the waste solution stream into the water stream; and
    recycling the sodium hydroxide-containing stream back into the etch tank.

2. A method according to claim 1 wherein the streams of water and waste solution flow countercurrently through the dialyzer.

3. A method according to claim 1 wherein the water directed into the dialyzer is first softened.

4. A method according to claim 1 wherein the water directed into the dialyzer is first degassed.

5. A method according to claim 1 wherein the ratio of the flow rate of the water to the waste solution is between 0.5 and 4.0 to 1.

6. A method according to claim 1 wherein the water directed into the dialyzer is heated to a temperature between 105° F. and 130° F.

7. A method according to claim 1 wherein the waste solution exiting from the dialyzer is directed into settling vessel means to precipitate aluminum hydroxide therefrom.

8. A method according to claim 7 wherein the waste solution exiting from the dialyzer is cooled to a temperature between 65° F. and 115° F. before being directed into the settling vessel means.

9. A method according to claim 7 wherein overflow liquid from the settling vessel means is directed back into the etch tank.

10. A method according to claim 7 comprising further directing a stream of the overflow liquid from the settling vessel means into a second diffusion dialyzer containing permeable membrane means that is permeable to sodium hydroxide and substantially less permeable to dissolved aluminum on one side of the membrane means;
    simultaneously directing a stream of deionized water into the second dialyzer on the opposite side of the membrane means; and
    directing the water stream into the etch tank.

11. A method according to claim 7 wherein the settling vessel means comprises a particle-contacting crystallizer adapted to provide nucleating sites for the precipitation of the aluminum hydroxide.

12. A method according to claim 1 wherein said membrane means comprises at least one ion-exchange membrane.

13. A method according to claim 12 wherein the dialyzer comprises a stack of a plurality of ion-exchange membranes providing liquid flow channels on opposite sides of each of the membranes, and periodically purging the dialyzer of gas bubbles formed in the channels by the diffusion of sodium hydroxide into the water stream.

14. Apparatus for recovering sodium hydroxide and aluminum hydroxide from an etch tank waste solution comprising:
  diffusion dialysis means having channels on opposite sides of permeable membrane means that is permeable to sodium hydroxide and substantially less permeable to dissolved aluminum for receiving respectively a stream of the waste solution and a stream of water;
  pumping means for directing said two streams in opposite directions through the dialysis means on opposite sides of said membrane means; and
  settling vessel means for receiving the waste solution exiting from the diffusion dialysis means and collecting aluminum hydroxide precipitating therein.

15. Apparatus according to claim 14 wherein said membrane means comprises an ion-exchange membrane.

16. Apparatus according to claim 15 wherein said diffusion dialysis means comprises a dialyzer having a stack of a plurality of ion-exchange membranes and means purging gas bubbles forming in the channels during flow of the streams of liquids therethrough.

17. Apparatus according to claim 14 comprising deionizing and degassing means for treating the water before pumping into the diffusion dialysis means.

18. Apparatus according to claim 14 wherein the settling vessel means comprises a particle-contacting crystallizer for providing nucleating sites for the precipitation of aluminum hydroxide.

19. A method of recovering sodium hydroxide and aluminum hydroxide from a sodium aluminate solution comprising:
  directing a stream of sodium aluminate solution into a diffusion dialyzer containing permeable membrane means that is permeable to sodium hydroxide and substantially less permeable to sodium aluminate on one side of the membrane means;
  simultaneously directing a stream of water into the dialyzer on the opposite side of the membrane means whereby sodium hydroxide migrates through said membrane means from the sodium aluminate solution stream into the water stream;
  directing the water stream exiting from the dialyzer into a sodium hydroxide storage vessel; and
  directing the sodium aluminate stream exiting the dialyzer into settling vessel means to precipitate aluminum hydroxide therefrom.

20. A method according to claim 19 wherein the streams of sodium aluminate solution and water flow countercurrently through the dialyzer.

21. A method according to claim 19 wherein the water directed into the dialyzer is first softened and degassed.

22. A method according to claim 21 wherein the softened and degassed water is heated to a temperature between 105° F. and 130° F.

23. A method according to claim 19 wherein the sodium aluminate solution exiting from the dialyzer is cooled to a temperature between 65° F. and 115° F. before being directed into the settling vessel means.

* * * * *